(12) United States Patent
Izmirliev (10) Patent No.: US 11,520,977 B1
(45) Date of Patent: Dec. 6, 2022

(54) STATISTICAL JOIN METHODS FOR DATA MANAGEMENT

(71) Applicant: Bank of America Corporation, Charlotte, NC (US)

(72) Inventor: Antoan Izmirliev, London (GB)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/341,909

(22) Filed: Jun. 8, 2021

(51) Int. Cl.
| | |
|---|---|
| *G06F 40/177* | (2020.01) |
| *G06F 40/197* | (2020.01) |
| *G06F 40/174* | (2020.01) |
| *G06F 16/2455* | (2019.01) |

(52) U.S. Cl.
CPC ........ *G06F 40/177* (2020.01); *G06F 16/2456* (2019.01); *G06F 40/174* (2020.01); *G06F 40/197* (2020.01)

(58) Field of Classification Search
CPC .... G06F 40/177; G06F 40/174; G06F 40/197; G06F 16/2456
See application file for complete search history.

(56) References Cited

U.S. PATENT DOCUMENTS

| | | | | |
|---|---|---|---|---|
| 6,694,306 B1 * | 2/2004 | Nishizawa | ........ | G06F 16/24539 707/999.102 |
| 6,732,107 B1 | 5/2004 | Luo et al. | | |
| 6,804,678 B1 * | 10/2004 | Luo | ....... | G06F 16/2456 707/999.005 |
| 7,113,957 B1 * | 9/2006 | Cohen | .......... | G06F 16/284 707/999.102 |
| 7,167,868 B2 * | 1/2007 | Shin | ........ | G06F 16/40 707/999.102 |
| 7,502,802 B2 | 3/2009 | Fontoura et al. | | |
| 8,935,257 B1 * | 1/2015 | Vemuri | ........ | G06F 7/36 707/741 |
| 9,330,129 B2 | 5/2016 | Vemuri et al. | | |
| 9,756,551 B2 | 9/2017 | Daragon et al. | | |
| 9,876,487 B2 | 1/2018 | Ayotte et al. | | |
| 10,025,822 B2 | 7/2018 | Das et al. | | |
| 10,162,857 B2 * | 12/2018 | Khayyat | ........ | G06F 16/24537 |
| 10,194,374 B2 | 1/2019 | Kim et al. | | |
| 10,200,016 B2 | 2/2019 | Ayotte et al. | | |
| 10,496,760 B2 * | 12/2019 | Boehme | ........ | G06F 16/24557 |
| 10,601,404 B2 | 3/2020 | Ayotte et al. | | |
| 10,635,671 B2 * | 4/2020 | Sheng | ........ | G06F 16/24537 |
| 2012/0310917 A1 * | 12/2012 | Sheinin | ........ | G06F 16/24561 707/E17.054 |
| 2019/0294717 A1 | 9/2019 | Dar | | |

\* cited by examiner

*Primary Examiner* — Mark D Featherstone
*Assistant Examiner* — Kweku William Halm
(74) *Attorney, Agent, or Firm* — Banner & Witcoff, Ltd.

(57) ABSTRACT

Aspects of the disclosure relate to joining data tables. A computing platform may input two or more tables into a statistical join function, which may initiate execution of the statistical join function, and where executing the statistical join function comprises applying one or more of: an end condition function, a partition tables function, or an outer join function to generate a new table that includes information from the two or more tables. The computing platform may send, to a user device, the new table and one or more commands directing the user device to display the new table, which may cause the user device to display the new table.

16 Claims, 10 Drawing Sheets

Table A

| Value0 | Value1 | Value2 | Value3 | Value4 | Value5 |
|--------|--------|--------|--------|--------|--------|
| Book_A | 123 | 10 | 30 | 3 | 1 |
| Book_A | 124 | 10 | 30 | 3 | 1 |
| Book_A | 125 | 10 | 30 | 3 | 1 |
| Book_A | 126 | 10 | 30 | 3 | 1 |

Table B

| Value0 | Value1 | Value2 | Value3 | Value4 | Value5 |
|--------|--------|--------|--------|--------|--------|
| Book_A | 123 | 10 | 30 | 3 | NA |
| NA | NA | 21 | 35 | 6 | NA |
| Book_A | 124 | 10 | 30 | 3 | NA |
| NA | NA | 21 | 35 | 6 | NA |
| Book_A | 125 | 10 | 30 | 3 | NA |
| NA | NA | 21 | 35 | 6 | NA |
| Book_A | 126 | 10 | 30 | 3 | NA |
| NA | NA | 21 | 35 | 6 | NA |

FIG. 5

New Table

| Value0 | Value1 | Value2 | Value3 | Value4 | Value5 | Value0_0 | Value1_0 | Value2_0 | Value3_0 | Value4_0 | Value5_0 |
|---|---|---|---|---|---|---|---|---|---|---|---|
| Book_A | 126 | 10 | 30 | 3 | 1 | Book_A | 126 | 10 | 30 | 3 | NA |
| Book_A | 123 | 10 | 30 | 3 | 1 | Book_A | 123 | 10 | 30 | 3 | NA |
| Book_A | 125 | 10 | 30 | 3 | 1 | Book_A | 125 | 10 | 30 | 3 | NA |
| Book_A | 124 | 10 | 30 | 3 | 1 | Book_A | 124 | 10 | 30 | 3 | NA |
| NA | NA | NA | NA | NA | NA | NA | NA | 21 | 35 | 6 | NA |
| NA | NA | NA | NA | NA | NA | NA | NA | 21 | 35 | 6 | NA |
| NA | NA | NA | NA | NA | NA | NA | NA | 21 | 35 | 6 | NA |
| NA | NA | NA | NA | NA | NA | NA | NA | 21 | 35 | 6 | NA |

STATISTICAL JOIN METHODS FOR DATA MANAGEMENT

BACKGROUND

Aspects of the disclosure relate to computing systems using join methods for table combination. In some cases, data tables may be joined by providing a list of columns and matching the corresponding values (e.g., using join, outer join, or other methods). Although these methods may be sufficient when a number of columns to join is known and fixed, they may be error prone and/or result in a confusing mechanical expansion of data when data is missing and/or different data is used. Such deficiencies may be amplified as tables increase in size. Accordingly, organizations may be unable to effectively combine such large data tables automatically, and may be forced to identify other methods for combination.

SUMMARY

Aspects of the disclosure provide effective, efficient, scalable, and convenient technical solutions that address and overcome the technical problems associated with merging data tables. In accordance with one or more embodiments of the disclosure, a computing platform comprising at least one processor, a communication interface, and memory storing computer-readable instructions may input two or more tables into a statistical join function, wherein inputting the two or more tables into the statistical join function initiates execution of the statistical join function, and wherein executing the statistical join function comprises: a) identifying whether or not any of the two or more tables comprise a single row; b) if any of the two or more tables comprise a single row, executing an end condition function and returning to step a); c) if none of the two or more tables comprise a single row, executing a partition tables function; d) identifying whether the two or more tables are both empty; e) if the two or more tables are both empty, returning to step a); f) if the two or more tables are not both empty, executing a merge tables function; g) identifying whether at least one of the two or more tables are empty; h) if at least one of the two or more tables are empty, executing an apply outer join function and returning to step a); i) if none of the two or more tables are empty, identifying whether a vector R is empty, wherein the vector R is indicative of a merged version of the two or more tables; j) if R is empty, executing the apply outer join function and returning to step a); and k) if R is not empty, generating a new table that includes information from the two or more tables in a single table. The computing platform may send, to a user device, the new table and one or more commands directing the user device to display the new table, which may cause the user device to display the new table.

In one or more instances, the computing platform may execute the end condition function by: 1) extracting frequency data for columns of the two or more tables with common values by executing a columns with common values function on a vector FDATA, and 2) extracting a vector of columns with common values from the vector FDATA, by executing the apply outer join function, where the vector of columns comprises the vector R.

In one or more examples, the computing platform may execute the columns with common values function by: for each column in a list of columns included in the two or more tables: 1) storing a first set of values for each column from a first table of the two or more tables, 2) storing a second set of values for each column from a second table of the two or more tables, 3) storing an intersection of the first set of values and the second set of values, 4) if the intersection includes at least one value, storing a number of values comprising the intersection and a proportion of them to the first set of values and the second set of values respectively in the vector FDATA, and 5) outputting the vector FDATA.

In one or more instances, the computing platform may execute the apply outer join function by: 1) applying an outer join function to join the at least two tables to create a sub-table; 2) adding the sub-table to the vector R; 3) setting the at least two tables to be empty; and 4) outputting the at least two tables and the vector R.

In one or more embodiments, the computing platform may execute the partition tables function by: 1) extracting frequency data for columns from the at least two tables with common values; 2) generating a vector FDATA using the frequency data; 3) extracting, from the vector FDATA, all columns for which values, common between the at least two tables, are greater than 1; 4) generating a vector CCSPLIT using the extracted columns; 5) if CCSPLIT contains at least one column: a) generate vectors of row values for the CCSPLIT columns; b) identify intersection vectors of the row value vectors and the extracted columns; c) store the intersection vectors as a vector CVAL; and d) for each element of the vector CVAL that contains a value: i) storing a corresponding column name; ii) applying a split table function to generate new versions of the at least two tables; iii) if the at least two tables have a different number of rows, applying a rsplit tables function; iv) applying a statistical join function to generate a new sub-table; v) adding the new sub-table to the vector R; and vi) removing, from each of the two or more tables, rows belonging to the new version of the corresponding table of the two of more tables; and 6) outputting the two or more tables and the vector R.

In one or more instances, the computing platform may perform the split table function by: 1) storing, in a table Ntable, all rows for which columns of the two or more tables have values in a vector VALS; and 2) outputting the Ntable.

In one or more instances, the computing platform may apply the rsplit table function by: 1) storing a copy of each of the two or more tables in the corresponding new versions of the two or more tables; 2) extracting the frequency data for columns with common values in the vector FDATA; 3) inputting the vector FDATA into the columns with common values function; 4) removing, from the vector FDATA, all columns for which the values, common between the two or more tables are 1 and their respective frequencies are also 1, resulting in a vector CC; 5) if the vector CC contains at least a single value: a) generating a vector BMCC that includes binary masks of the columns in the vector CC, b) for each binary mask in the vector BMCC, extracting a vector CMROWS, comprising a collection of corresponding rows from the two or more tables in which the corresponding binary mask is applied, and c) for each element of the vector CMROWS that includes at least a single value: i) computing the new versions of the two or more tables using the split table function; and ii) if the new versions of the two or more tables include at least a single value, outputting the new versions of the two or more tables.

In one or more embodiments, the computing platform may execute the merge tables function by: 1) extracting frequency data for columns of the two or more tables in a vector FDATA; 2) inputting the vector FDATA into the columns with common values function; 3) based on execution of the columns with common values function on the vector FDATA, removing all columns for which values, common between the two or more tables are 1 and have a frequency of 1 in each of the two or more tables, resulting in a vector CCMERGE; 4) if the vector CCMERGE includes at least a single value: a) generating, for each column of the vector CCMERGE, generate a binary mask; b) for each binary mask: i) extracting a vector CMROWS comprising a collection of corresponding rows from the two or more tables with the given binary mask applied; ii) for each element of the vector CMROWS that includes at least a single value: A) using a split table function to define new versions of the two or more tables; B) executing an outer join function to generate a new sub-table; C) adding the new sub-table to the vector R; and D) removing, from each of the two or more tables, rows belonging to the corresponding new versions of the two or more tables; and 5) outputting the two or more tables and the vector R.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure relate to an improved method for joining one or more data tables together. For example, existing table join algorithms may work well when numbers of columns to join are known and fixed. However, they might not work well with different or missing data. Under such conditions, such matches may result in a confusing mechanical expansion of data. For example, a simple two row table may yield four rows. When data is larger, results may grow even faster.

Accordingly, described herein is a statistical join function that works on the basis of splitting tables into similar sub-tables, which may be more likely to be joined together. The methods described herein implement statistical measures to decide which operation (e.g., splitting or merging) to apply.

The algorithm, statistical join or SJoin for short, may aggregate two tables horizontally. It may work on the basis of splitting the tables into similar sub-tables, which may be more likely to be joined together. For example, a subset of rows from each table (e.g., tables TA and TB) may be identified to share similar features, and may be extracted to form a new sub-table SubTABi, where the rows from table TA, precede these from table TB and i is the index of the new sub-table, starting from 1. The feature similarity may be based on the probability of similarity in rows and columns. For each corresponding column in TA and TB, the sets of values are extracted, and respectively labelled SCA and SCB. The intersection of the two sets may be determined and stored as the number of common values and the proportion of the common values against the length of SCA and SCB respectively.

When the split and match options are not applicable, the normal outer join operation may be used to join the tables. This may be the fall back condition.

The process may continue until there are no more rows in the original tables. The set of sub-tables are used to form a new table which represents a most likely match of the two original tables.

Aspects described herein may include splitting large tables into smaller, more manageable tables, and/or the use of various statistical measures to determine or identify which operation (splitting or merging) to apply.

This may be particularly applicable to storage and manipulation of trade data. For example, a large number of attributes may be extracted per trade, and may be compared with the data in a similarly organized table. It may be important for the correct rows to be matched and for the rows to be as few as possible. Traditional methods fail to deliver a stable, extensible solution and the data may bloat.

Figure 1A:
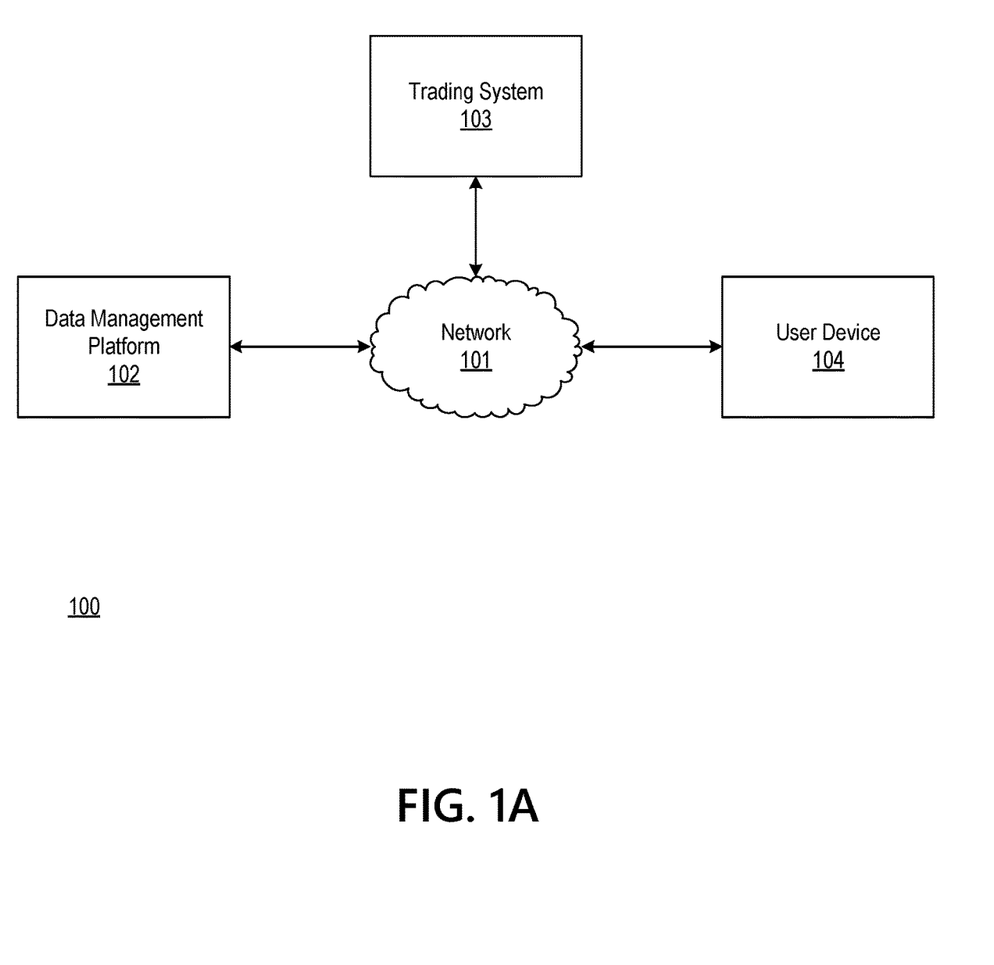
FIGS. 1A-1B depict an illustrative computing environment for implementing statistical join methods for combining data tables in accordance with one or more example embodiments.
Figure 1B:
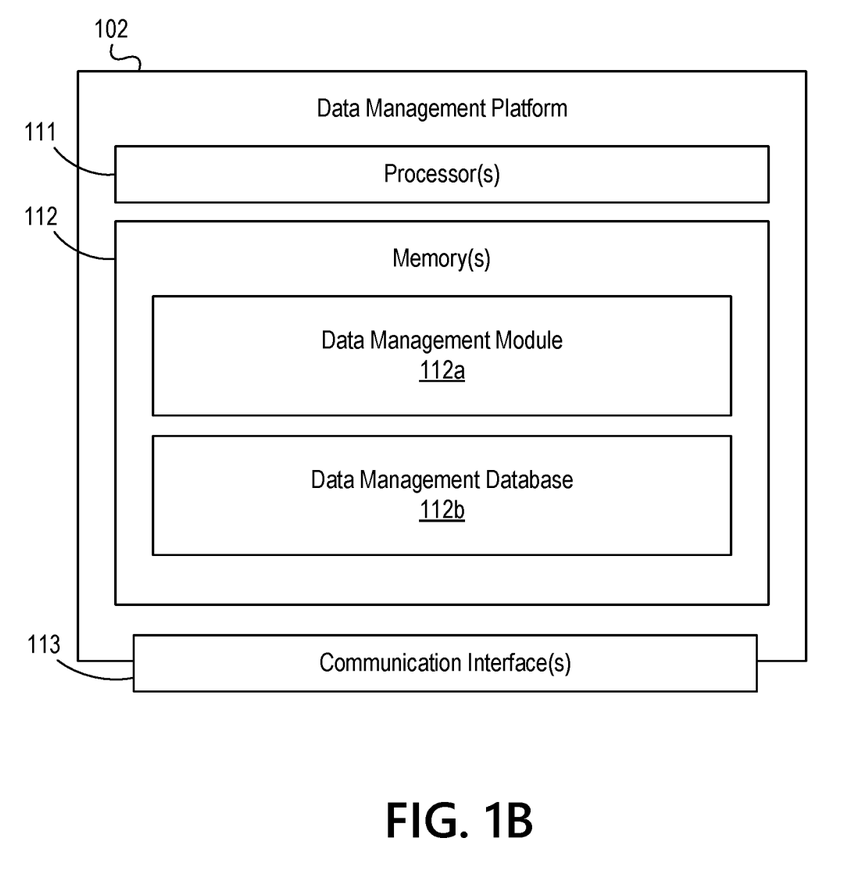

FIGS. 1A-1B depict an illustrative computing environment that implements statistical join methods for combining data tables in accordance with one or more example embodiments. Referring to FIG. 1A, computing environment 100 may include one or more computer systems. For example, computing environment 100 may include a data management platform 102, a trading system 103, and a user device 104.

As described further below, data management platform 102 may be a computer system that includes one or more computing devices (e.g., servers, server blades, or the like) and/or other computer components (e.g., processors, memories, communication interfaces) that may be used to host one or more data tables and execute one or more functions/algorithms to manipulate the data tables. For example, the data management platform 102 may be configured to perform a statistical join algorithm to combine one or more tables.

Trading system 103 may be or include one or more computing devices (servers, server blades, or the like) that may be configured to execute or otherwise perform one or more trades (e.g., stock trades, fund trades, and/or other trades). The trading system 103 may be configured to communicate with the data management platform 102 to send information about the trades.

User device 104 may be a laptop computer, desktop computer, mobile device, tablet, smartphone, or the like that may be used by an individual to view or otherwise access information stored at the data management platform 102

(e.g., one or more data tables). In some instances, user device 104 may be configured to display one or more user interfaces (e.g., which may include the one or more data tables).

Computing environment 100 also may include one or more networks, which may interconnect data management platform 102, trading system 103, and/or user device 104. For example, computing environment 100 may include a network 101 (which may interconnect, e.g., data management platform 102, trading system 103, and/or user device 104).

In one or more arrangements, data management platform 102, trading system 103, and/or user device 104 may be any type of computing device capable of sending and/or receiving requests and processing the requests accordingly. For example, data management platform 102, trading system 103, user device 104, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of data management platform 102, trading system 103, and/or user device 104 may, in some instances, be special-purpose computing devices configured to perform specific functions.

Referring to FIG. 1B, data management platform 102 may include one or more processors 111, memory 112, and communication interface 113. A data bus may interconnect processor 111, memory 112, and communication interface 113. Communication interface 113 may be a network interface configured to support communication between data management platform 102 and one or more networks (e.g., network 101, or the like). Memory 112 may include one or more program modules having instructions that when executed by processor 111 cause data management platform 102 to perform one or more functions described herein and/or one or more databases that may store and/or otherwise maintain information which may be used by such program modules and/or processor 111. In some instances, the one or more program modules and/or databases may be stored by and/or maintained in different memory units of data management platform 102 and/or by different computing devices that may form and/or otherwise make up data management platform 102. For example, memory 112 may have, host, store, and/or include data management module 112a and data management database 112b.

Data management module 112a may have instructions that direct and/or cause data management platform 102 to execute statistical join methods to combine tables, as discussed in greater detail below. Data management database 112b may store information used by data management module 112a and/or data management platform 102 in application of advanced techniques to join data tables, and/or in performing other functions.

Figure 2A:
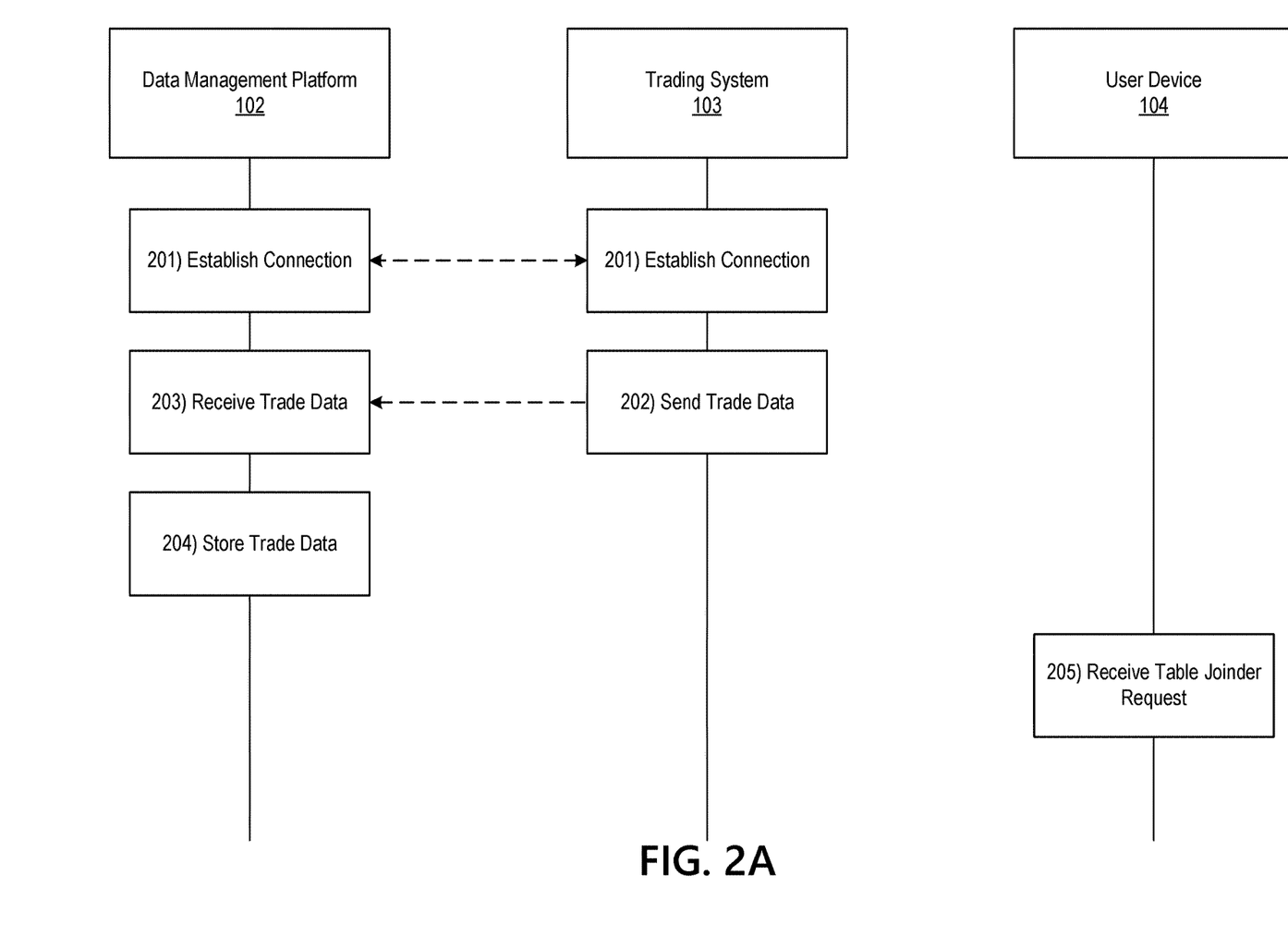
FIGS. 2A-2E depict an illustrative event sequence for implementing statistical join methods for combining data tables in accordance with one or more example embodiments.

FIGS. 2A-2E depict an illustrative event sequence for performing statistical join methods for combining data tables in accordance with one or more example embodiments. Referring to FIG. 2A, at step 201, the trading system 103 may establish a connection with data management platform 102. For example, the trading system 103 may establish a first wireless data connection with the data management platform 102 to link the trading system 103 with the data management platform 102 (e.g., in preparation for sending trade data). In some instances, the trading system 103 may identify whether or not a connection is already established with the data management platform 102. If a connection is already established with the data management platform 102, the trading system 103 might not re-establish the connection. If a connection is not yet established with the data management platform 102, the trading system 103 may establish the first wireless data connection as described above.

At step 202, the trading system 103 may send trade data (e.g., accounts, amounts, timestamps, and/or other information) to the data management platform 102. For example, the trading system 103 may send trade data to the data management platform 102 while the first wireless data connection is established.

At step 203, the data management platform 102 may receive the trade data sent at step 202. For example, the data management platform 102 may receive the trade data via the communication interface 113 and while the first wireless data connection is established. Although a single source of trading data (e.g., trading system 103) is shown, this is merely for illustrative purposes. For example, in some instances, parameters may be extracted for the same trade from multiple systems. In some instances, in receiving the trade data, the data management platform 102 may receive parameters in which values are missing and/or different. In some instances, the trade data for a single trade may correspond to multiple rows.

At step 204, the data management platform 102 may store the trade data received at step 203. For example, the data management platform 102 may store the trade data in one or more tables, such as table A and table B, which are illustrated in tables 405 and 505 (shown in FIGS. 4 and 5 respectively).

At step 205, the user device 104 may receive a request to join two or more tables stored at the data management platform 102. For example, the user device 104 may receive the request from a system administrator, data manager, and/or other individual.

Figure 2B:
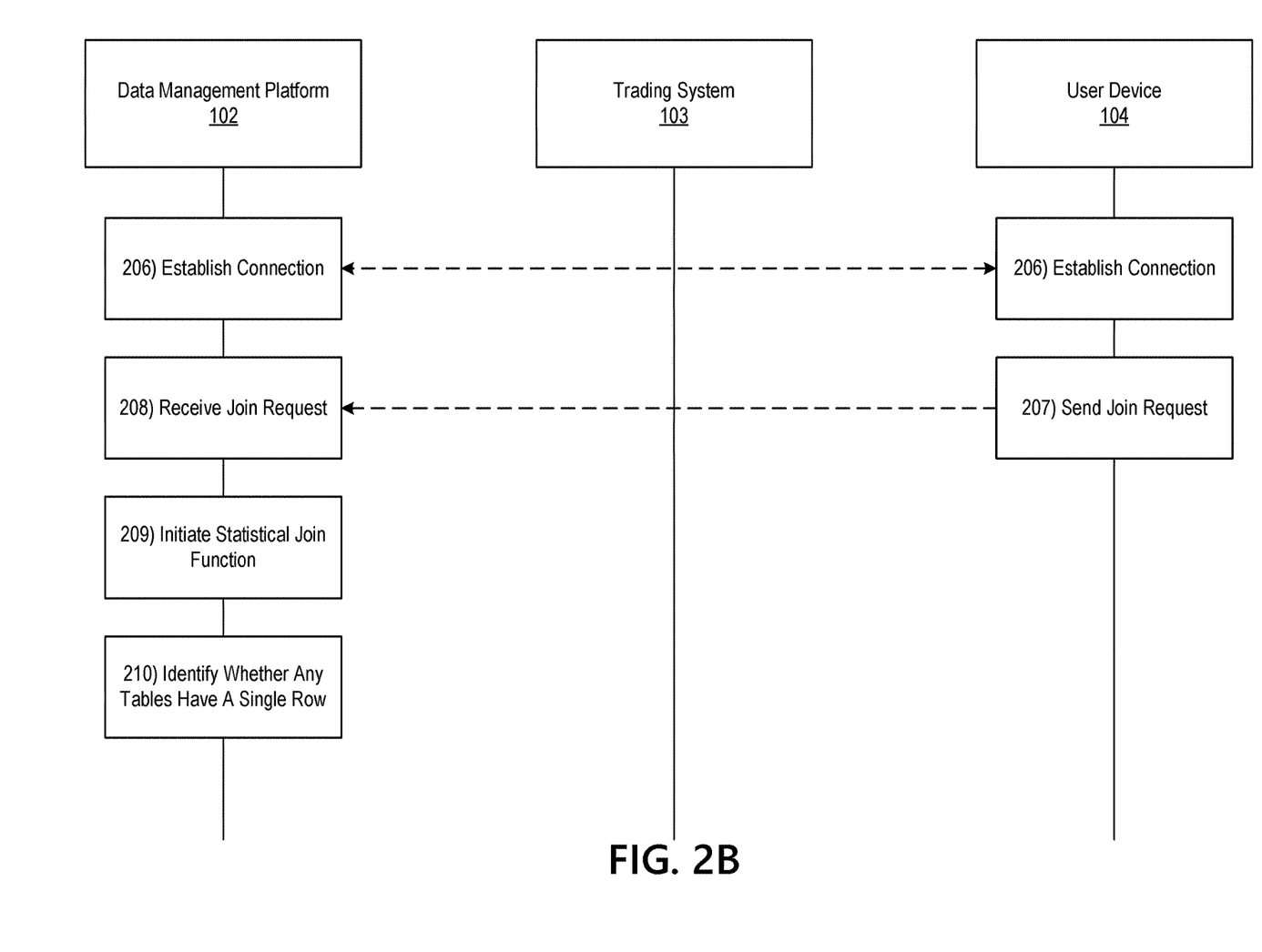

Referring to FIG. 2B, at step 206, the user device 104 may establish a connection with the data management platform 102. For example, the user device 104 may establish a second wireless connection with the data management platform 102 to link the user device 104 to the data management platform 102 (e.g., in preparation for sending a request to join the tables). In some instances, the user device 104 may identify whether or not a connection is already established with the data management platform 102. If a connection is already established with the data management platform 102, the user device 104 might not re-establish the connection. If a connection is not yet established with the data management platform 102, the user device 104 may establish the second wireless data connection as described herein.

At step 207, the user device 104 may send a request to join the two or more tables to the data management platform 102. For example, the user device 104 may send the request to join the two or more tables while the second wireless data connection is established.

At step 208, the data management platform 102 may receive the request to join the two or more tables. For example, the data management platform 102 may receive the request to join the two or more tables via the communication interface 113 and while the second wireless data connection is established. In some instances, rather than receiving a request from the user device 104 to join the two or more tables, the data management platform 102 may identify that two or more tables should be joined (e.g., to conserve memory, computing resources, or the like). In these instances, steps 205-208 might not be performed.

At step 209, based on identifying that the two or more tables should be joined, the data management platform 102 may initiate a statistical join function, which is further described below with regards to steps 209-220. For example, two tables may be joined by providing a list of columns, the values of which are to be matched. Existing solutions may be sufficient when a number of columns to join is known and fixed throughout the use of the logic. However, such solutions might not work well with different or missing data. Under such conditions, such matches may result in a confusing mechanical expansion of data.

The algorithm, statistical join (or sJoin) may be used by the data management platform 102 to aggregate tables horizontally. It may work by splitting the tables into similar sub-tables, which may be better configured/formatted to be joined together. In doing so, statistical measures may be used to determine or identify which operation (e.g., splitting or merging) should be applied.

Briefly, and as described further below, a subset of rows from each table (e.g., TA and TB) may be identified to share similar features and extracted to form a new sub-table SubTAB$_i$, where the rows from table TA, precede those from table TB and i is the index of the new sub-table, starting from 1. The feature similarity may be based on the probability of similarity in rows and columns. For each corresponding column in TA and TB, the sets of values are extracted, and respectively labelled SCA and SCB. The intersection of the two sets may be determined and stored as the number of common values and proportion of the common values against the length of SCA and SCB respectively.

When the split and match options are not applicable, the normal outer join operation may be used to join the tables as a fall back condition.

The process may continue until there are no more rows in the original tables. The set of sub-tables are used to form a new table which represents a most likely match of the two original tables.

Although two example tables TA and TB are described herein, this is purely arbitrary and may be renamed and/or reordered without departing from the scope of the disclosure.

In some instances, the selection of columns on which the statistical join algorithm may operate may be user dependent. It might not be necessary to be continuous as in the tables they refer to. However, the columns should belong to both tables and have the same type. This may allow much larger tables to be joined by using a subset of columns to join. For example, TA may comprise 10 columns and 10 rows, but table TB may include 7 columns and 20 rows. Assuming only 5 of the columns will be used in the joining process, the expected table will have 17 columns and 20 rows if the match is successful.

Execution of the statistical join algorithm may assume several baseline parameters. For example, it may be assumed that table functionality is available (e.g., tables are constructs that may be partitioned by splitting to tables with fewer rows, up to a single row, and aggregated into larger tables by adding/appending tables at the top or bottom of them). In addition, tables TA and TB may have identical types of values for the columns of interest (TA and TB are used herein to indicate the order in which resulting rows may be created (e.g., row from table TA followed by its matching row from table TB)). Furthermore, these methods assume that the outer join operation and the ability to use vectors are available, and that there is more than one element in the columns of interest list.

Accordingly, upon initiating the statistical join algorithm, the data management platform 102 may use the following as inputs: the tables (e.g., TA and TB), a vector/list of columns to operate on (COLS), and a flag indicating whether columns with the same name are to be merged into a single column. Additionally, the data management platform 102 may set a vector R as an empty vector that may be used to store new merged sub-tables.

The data management platform 102 may identify whether both tables (e.g., TA and TB) have rows. If so, the data management platform 102 may proceed to step 210. If both tables do not have rows, the data management platform 102 may return to step 204 to await another table join request, or the event sequence may end.

At step 210, the data management platform 102 may identify whether either of the tables (e.g., TA and TB) have more than one row. If so, the data management platform 102 may proceed to step 211. If not, the data management platform 102 may proceed to step 212.

Figure 2C:
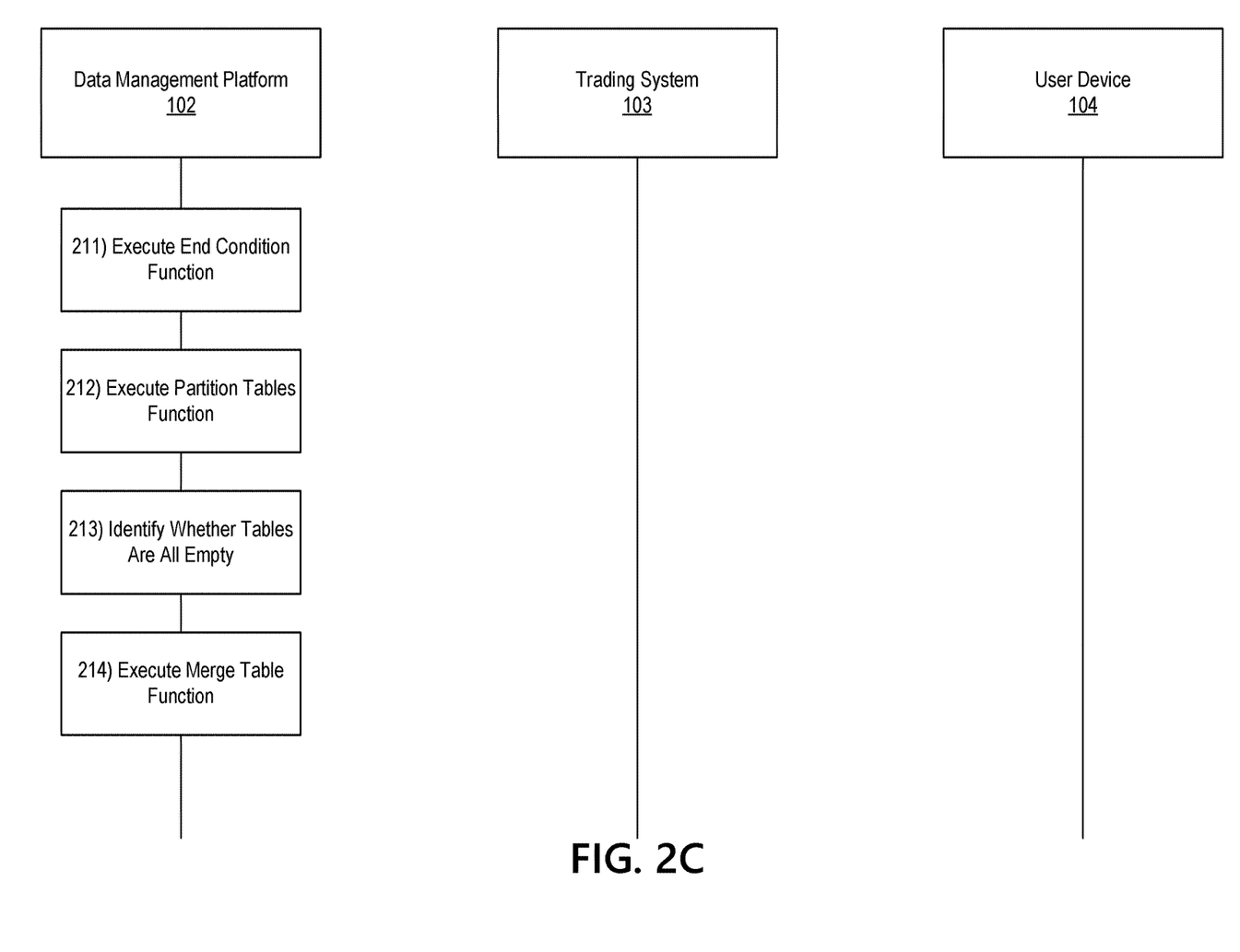

Referring to FIG. 2C, at step 211, the data management platform 102 may execute an end condition function. For example, the data management platform 102 may extract frequency data for columns with common values in a vector (FDATA). In some instances, to do so, the data management platform 102 may execute a columns with common values function. For example, the data management platform 102 may set FDATA to be empty. Then, for each column in COLS, the data management platform 102 may store a first set of values from the column from TA (e.g., in SCA) and a second set of values from the column in TB (e.g., in SCB). The data management platform 102 may then store the intersection of these value sets (e.g., of SCA and SCB) in, for example, SCC. If SCC includes at least one value, the data management platform 102 may store, in FDATA, the number of entries in SCC and the proportion of them to the entries of SCA and SCB respectively, and may then return FDATA. Otherwise, if SCC is empty, the data management platform 102 may simply return FDATA.

Figure 4:
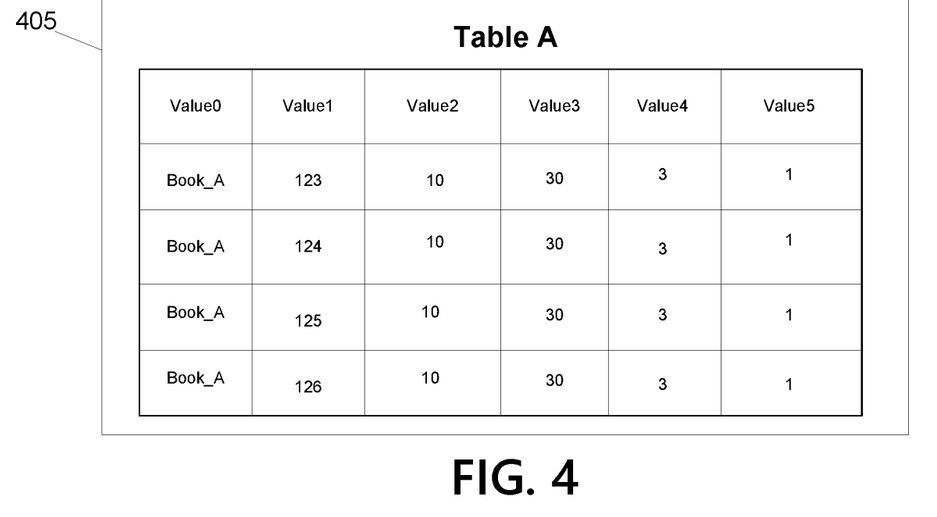
FIGS. 4-6 depict illustrative graphical user interfaces for implementing statistical join methods for combining data tables in accordance with one or more example embodiments.
Figure 5:
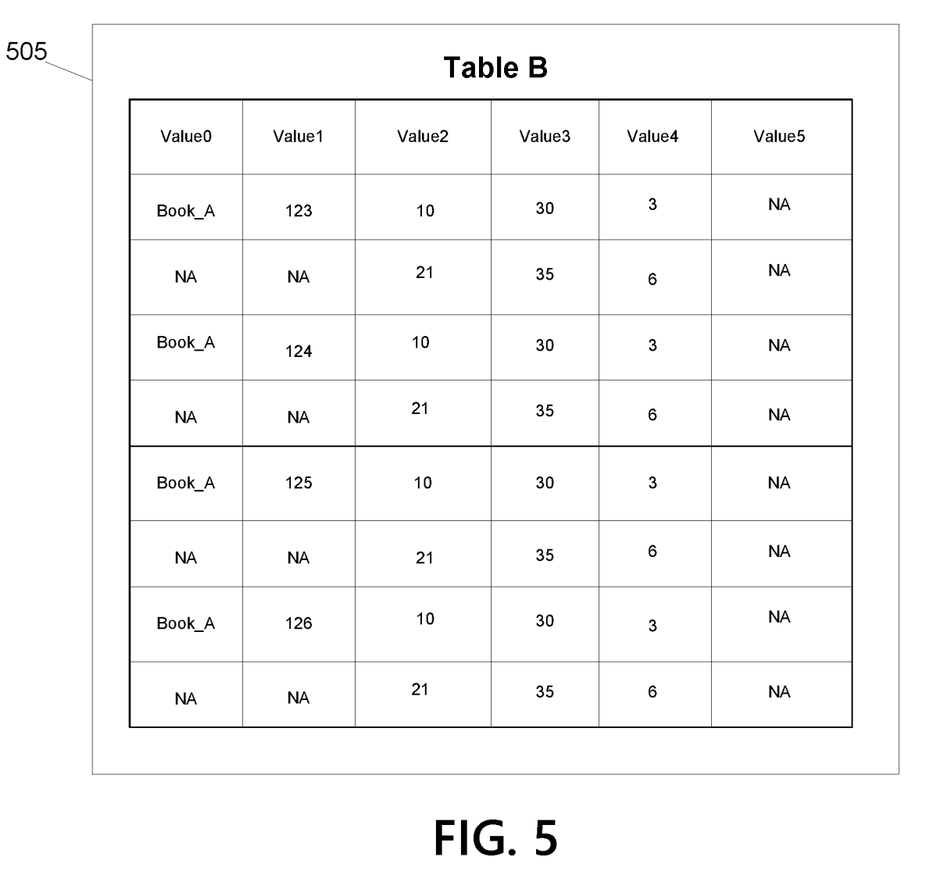

As a particular example, using TA and TB (as illustrated in FIGS. 4 and 5), column 1 of TA includes a single value ("Book_A"). Column 1 of TB includes two values ("Book_A" and "NA"). Accordingly, column 1 of TA includes 1 value, all values from column 1 of TA are represented in column 1 of TB, and the values in column 1 of TA make up 50% of the values in column 1 of TB. As such, the data management platform 102 may output, for value 0, {Value0: [1, 1, 0.5] } in FDATA, where 1 indicates the number of values in TA column 1, 1 indicates that all values in TA column 1 are represented in TB column 1, and 0.5 indicates that the values from TA column 1 make up half of the available values in TB column 1.

Returning to the execution of the end condition function, the data management platform 102 may execute an apply outer join function. For example, the data management platform 102 may execute a standard outer join function to join the two tables TA and TB together, resulting in a new sub-table SubTAB$_i$. In some instances, the data management platform 102 may use the FLAG_MERGE_KEYS flag to identify whether or not columns with the same name should be merged into a single column. The data management platform 102 may then add the new sub-table SubTAB$_i$ to the vector R, set the tables TA and TB to empty, and return/output TA, TB, and R.

After completing execution of the end condition function to return TA, TB, and R, the data management platform 102 may then return to step 209.

At step 212, the data management platform 102 may execute a partition tables function. For example, the data management platform 102 may extract frequency data for columns with common values in FDATA by executing a columns with common values function (e.g., the columns with common values function as described above at step 211). The data management platform 102 may subsequently extract all columns, from FDATA, for which the values, common between the tables TA and TB are higher than 1, and may store these extracted columns in a vector CCSPLIT. The data management platform 102 may identify whether the vector CCSPLIT includes at least a single value. If so, the data management platform 102 may generate vectors of the row values for the CCSPLIT columns and may find their intersection vectors. The data management platform 102 may store these intersection vectors in vector CVAL. Then, for each non-empty element in the CVAL vector, the data management platform 102 may store corresponding column names in a vector SPLITCC and may use a split table function to set TA1 and TA2. For example, in applying the split table function, the data management platform 102 may store, in each of TA1 and TA2 respectively (e.g., NTable), all rows for which columns in COLS have values in the CVAL vector, and may return these tables TA1 and TA2.

After executing the split table function, the data management platform 102 may identify whether TA1 and TB1 have different numbers of rows. If so, the data management platform 102 may execute an Rsplit table function.

In executing the Rsplit table function, the data management platform 102 may store a copy of TA in TA1 and a copy of TB in TB1. The data management platform 102 may extract frequency data for columns with common values in FDATA by executing the columns with common values function as described above. Then, using FDATA, the data management platform 102 may remove all columns for which the values, common between the tables TA and TB are 1, and their respective frequencies are 1 and 1, and may set this as a vector CC. If the vector CC is empty, the data management platform 102 may simply return values of TA1 and TB1. If the vector CC includes at least a single value, the data management platform 102 may generate binary masks (BMCC) of the columns in vector CC, excluding the one with zeros (e.g., if there are only 2 columns then there are three masks 01, 10, and 11). For each binary mask, the data management platform 102 may extract a vector CMROWS as the collection of corresponding rows from tables TA and TB with binary masks applied (e.g., columns with corresponding values of 0 are ignored). For each non-empty element in the vector CMROWS, the data management platform 102 may set TA1 and TB1 using the split table function as described above. Then, if TA1 and TB1 include at least a single value, the data management platform 102 may return values of TA1 and TB1. Otherwise, if TA1 and TB1 are empty, the data management platform 102 may continue to perform the Rsplit tables function.

Returning to the partition tables function, the data management platform 102 may define new sub-table SubTAB$_j$, as described above, to the vector R. The data management platform 102 may then remove from TA the rows belonging to TA1 and remove from TB the rows belonging to TB1. The data management platform 102 may then return/output TA, TB, and the vector R.

At step 213, the data management platform 102 may identify whether TA and TB are both empty. If so, the data management platform 102 return to step 209. Otherwise, the data management platform 102 may proceed to step 214.

At step 214, the data management platform 102 may execute a merge tables function to define TA, TB, and the vector R. For example, the data management platform 102 may extract frequency data for columns with common values in FDATA (e.g., using the columns with common values function as described above). From FDATA, the data management platform 102 may remove all columns for which the values, common between the tables TA and TB are 1 and their respective frequencies are 1 and 1, and set these removed columns as a vector CCMERGE. If the vector CCMERGE is empty, the data management platform 102 may simply return values of TA, TB, and the vector R. If the vector CCMERGE includes at least a single value, the data management platform 102 may generate binary masks of the columns in CCMERGE, excluding the one with zeros (e.g., if there are only 2 columns then there are 3 masks 01, 10, and 11). For each binary mask, the data management platform 102 may extract a vector CMROWS as the collection of corresponding rows from tables TA and TB with the binary masks applied (while ignoring the columns with corresponding values of 0). For each non-empty element in CMROWS, the data management platform 102 may set TA1 and TA2 using the split table function as described above, and may set SubTAB$_i$ using the apply outer join function as described above. The data management platform 102 may then add the new sub-table SubTAB$_i$ to the sub-tables vector R, remove from TA the rows that belong to TA1, and remove the rows from TB that belong to TB1. The data management platform 102 may subsequently return/output TA, TB, and the vector R.

Figure 2D:
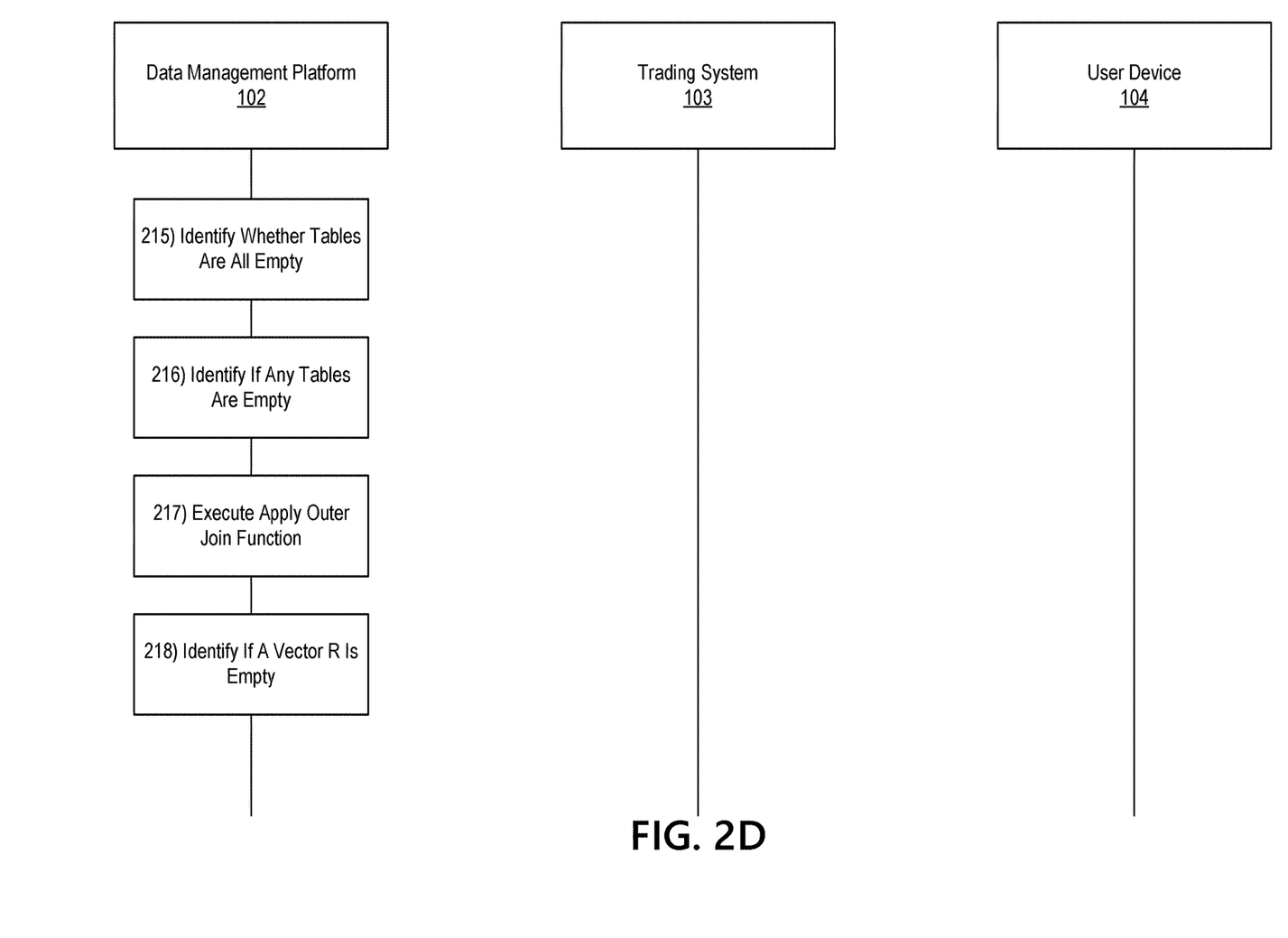

Referring to FIG. 2D, at step 215, the data management platform 102 may identify whether TA and TB are both empty. If so, the data management platform 102 may return to step 209. If not, the data management platform 102 may proceed to step 216.

At step 216, the data management platform 102 may identify whether TA or TB are empty. If not, the data management platform 102 may proceed to step 218. If so, the data management platform 102 may proceed to step 217.

At step 217, the data management platform 102 may execute an apply outer join function (e.g., as described above) to define TA, TB, and the vector R, and may return to step 209. At step 218, the data management platform 102 may identify whether the vector R is empty. If the vector R is includes at least one value, the data management platform 102 may proceed to step 220. If the vector R is empty, the data management platform 102 may proceed to step 219.

Figure 2E:
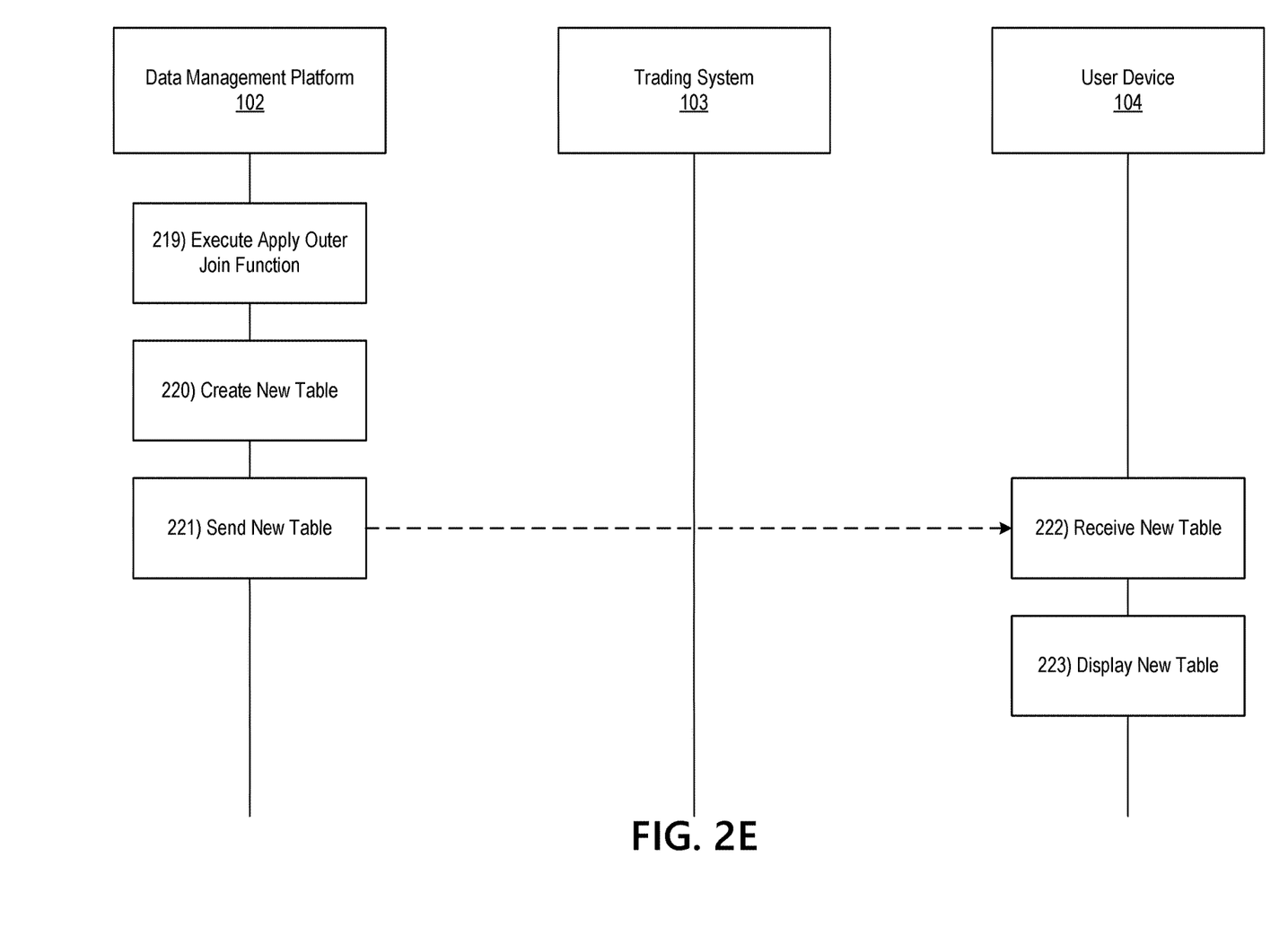
Figure 6:
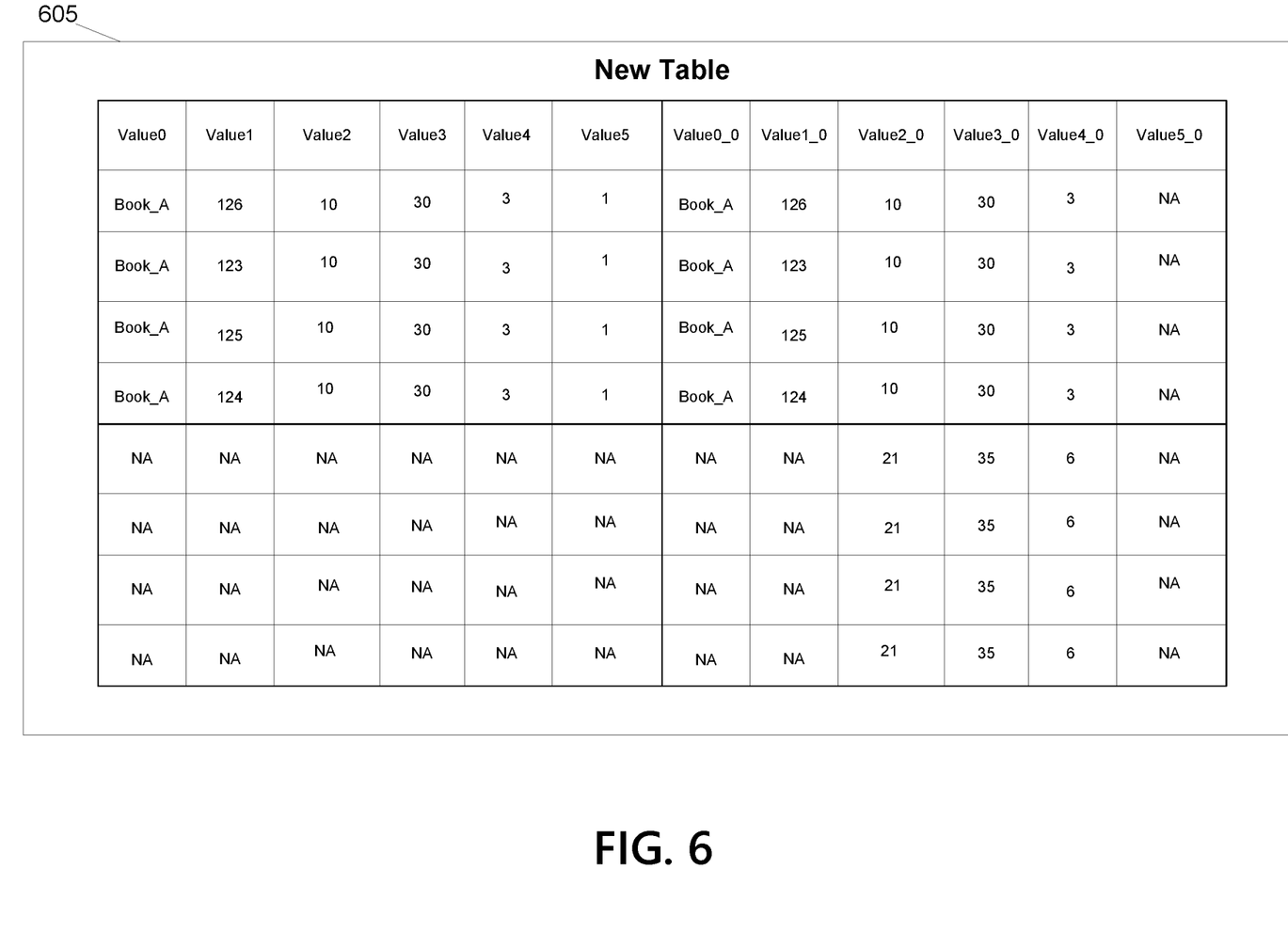

Referring to FIG. 2E, at step 219, the data management platform 102 may execute an apply outer join function as described above, and return to step 209. At step 220, the data management platform 102 may create a new table TAB from the vector R of created sub-tables SubTAB$_i$. For example, the data management platform 102 may create a new table that resembles table 605, which is illustrated in FIG. 6, and that includes the data from TA and TB (e.g., as shown in FIGS. 4-5) in a single table. At this point, the statistical join function may be complete.

At step 221, the data management platform 102 may send the new table to the user device 104. For example, the data management platform 102 may send the new table via the communication interface 113 and while the second wireless data connection is established. In some instances, the data management platform 102 may also send one or more commands directing the user device 104 to display the new table.

At step 222, the user device 104 may receive the new table sent at step 220. For example, the user device 104 may receive the new table while the second wireless data connection is established. In some instances, the user device 104 may also receive one or more commands directing the user device 104 to display the new table.

At step 223, based on or in response to the one or more commands directing the user device 104 to display the new table, the user device 104 may display the new table. For example, the user device 104 may display a graphical user interface that includes the table 605.

Although steps 201-223 as described above primarily refer to manipulation of data tables including trade data, these steps may be performed to manipulate tables that include any other data without departing from the scope of the disclosure.

Figure 3:
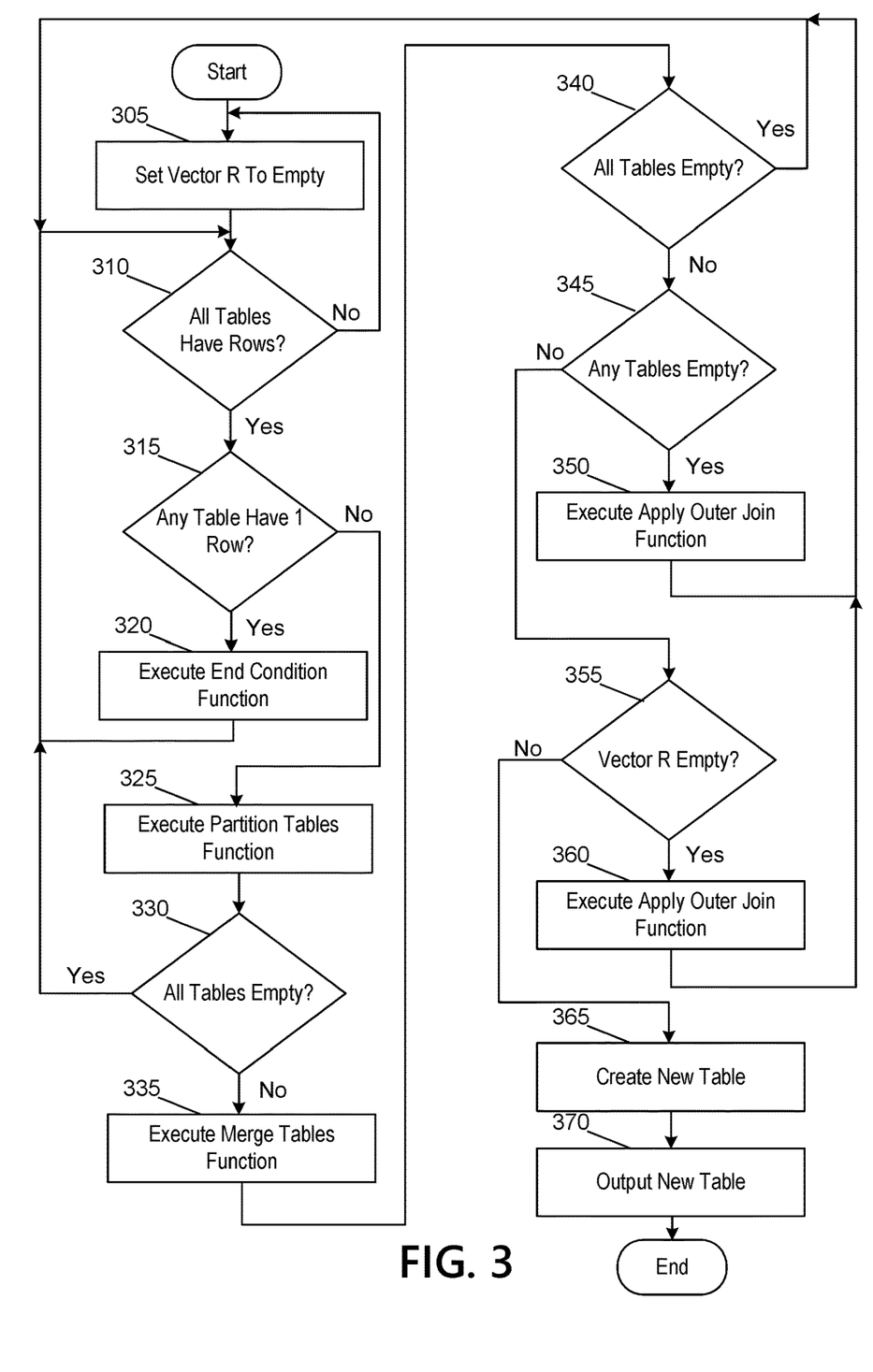
FIG. 3 depicts an illustrative statistical join method for combining data tables in accordance with one or more example embodiments.

FIG. 3 depicts an illustrative method for performing statistical join methods for combining data tables in accordance with one or more example embodiments. Referring to FIG. 3, at step 305, a computing platform having at least one processor, a communication interface, and memory may set a vector R to empty. At step 310, the computing platform may identify whether two tables (to be joined) both have rows. If not, the computing platform may return to step 305. If so, the computing platform may proceed to step 315.

At step 315, the computing platform may identify whether any tables have at least one row. If not, the computing platform may proceed to step 325. If so, the computing platform may proceed to step 320.

At step 320, the computing platform may execute an end condition function and return to step 310. At step 325, the computing platform may execute a partition tables function. At step 330, the computing platform may identify whether all tables are empty. If so, the computing platform may return to step 310. If not, the computing platform may proceed to step 335.

At step 335, the computing platform may execute a merge tables function. At step 340, the computing platform may identify whether all tables are empty. If so, the computing platform may return to step 310. If not, the computing platform may proceed to step 345.

At step 345, the computing platform may identify whether any tables are empty. If not, the computing platform may proceed to step 355. If so, the computing platform may proceed to step 350. At step 350, the computing platform may execute an apply outer join function, and then return to step 310.

At step 355, the computing platform may identify whether vector R is empty. If not, the computing platform may proceed to step 365. If so, the computing platform may proceed to step 360. At step 360, the computing platform may execute an apply outer join function, and return to step 310. At step 365, the computing platform may create a new table. At step 370, the computing platform may output the new table.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
   at least one processor;
   a communication interface communicatively coupled to the at least one processor; and
   memory storing computer-readable instructions that, when executed by the at least one processor, cause the computing platform to:
   input two or more tables into a statistical join function, wherein inputting the two or more tables into the statistical join function initiates execution of the statistical join function, and wherein executing the statistical join function comprises:
  a) identifying whether or not any of the two or more tables comprise a single row;
  b) if any of the two or more tables comprise a single row, executing an end condition function and returning to step a), wherein executing the end condition function joins at least two of the two or more tables comprising the single row and causes the at least two of the two or more tables comprising the single row to no longer comprise the single row;
  c) if none of the two or more tables comprise a single row, executing a partition tables function;
  d) identifying whether the two or more tables are both empty;
  e) if the two or more tables are both empty, executing a statistical join function to create a new table of the two or more tables, and returning to step a);
  f) if the two or more tables are not both empty, executing a merge tables function;
  g) identifying whether at least one of the two or more tables are empty;
  h) if at least one of the two or more tables are empty, executing an apply outer join function, wherein executing the apply outer join function creates a new table of the two or more tables, and returning to step a);
  i) if none of the two or more tables are empty, identifying whether a vector R is empty, wherein the vector R is indicative of a merged version of the two or more tables;
  j) if R is empty, executing the apply outer join function, wherein executing the apply outer join function creates a new table of the two or more tables and returning to step a); and
  k) if R is not empty, generate a new table that includes information from the two or more tables in a single table; and
send, to a user device, the new table and one or more commands directing the user device to display the new table, wherein sending the one or more commands directing the user device to display the new table causes the user device to display the new table.

2. The computing platform of claim 1, wherein executing the end condition function comprises:
  extracting frequency data for columns of the two or more tables with common values, wherein extracting the frequency data comprises executing a columns with common values function on a vector FDATA to identify a number of columns of the vector FDATA that include the common values; and
  extracting a vector of columns with common values from the vector FDATA, wherein extracting the vector of columns comprises executing the apply outer join function, wherein the vector of columns comprises the vector R.

3. The computing platform of claim 2, wherein executing the columns with common values function comprises:
  for each column in a list of columns included in the two or more tables:
    storing a first set of values for each column from a first table of the two or more tables,
    storing a second set of values for each column from a second table of the two or more tables,
    storing an intersection of the first set of values and the second set of values,
    identifying that the intersection includes at least one value,
    based on identifying that the intersection includes the at least one value, storing a number of values comprising the intersection in the vector FDATA; and
    outputting the vector FDATA.

4. The computing platform of claim 2, wherein executing the apply outer join function comprises:
  applying an outerjoin function to join the at least two tables to create a sub-table;
  adding the sub-table to the vector R;
  setting the at least two tables to be empty; and
  outputting the at least two tables and the vector R.

5. The computing platform of claim 1, wherein executing the partition tables function comprises:
  extracting frequency data for columns from the at least two tables with common values;
  generating a vector FDATA using the frequency data;
  extracting, from the vector FDATA, all columns for which values, common between the at least two tables, are greater than 1;
  generating a vector CCSPLIT using the extracted columns;
  identifying that CCSPLIT contains at least 1 column;
  based on identifying that CCSPLIT contains the at least 1 column:
    generate, for each row of the CCSPLIT columns, a row value vector that includes values of each of the rows of the CCSPLIT columns;
    identify intersection vectors of the row value vectors and the extracted columns;
    store the intersection vectors as a vector CVAL, wherein the vector CVAL comprises an array of elements corresponding to the intersection vectors; and
    for each element of the vector CVAL that contains a value:
      storing a corresponding column name from the extracted columns;
      applying a split table function to generate new versions of the at least two tables;
      applying a statistical join function to generate a new sub-table, wherein the at the statistical join function merges the at least two tables into the new sub-table;
      adding the new sub-table to the vector R; and
      removing, from each of the two or more tables, rows belonging to the new version of the corresponding table of the two of more tables; and
  outputting the two or more tables and the vector R.

6. The computing platform of claim 1, wherein executing the merge tables function comprises:
  extracting frequency data for columns of the two or more tables in a vector FDATA;
  inputting the vector FDATA into the columns with common values function;
  based on execution of the columns with common values function on the vector FDATA, removing all columns for which values, common between the two or more tables are 1 and have a frequency of 1 in each of the two or more tables, resulting in a vector CCMERGE;
  if the vector CCMERGE includes at least a single value:
    generating, for each column of the vector CCMERGE, generate a binary mask;
    for each binary mask:

extracting a vector CMROWS comprising a collection of corresponding rows from the two or more tables with the given binary mask applied;

for each element of the vector CMROWS that includes at least a single value:
- using a split table function to define new versions of the two or more tables;
- executing an outerjoin function to generate a new sub-table;
- adding the new sub-table to the vector R; and
- removing, from each of the two or more tables, rows belonging to the corresponding new versions of the two or more tables; and outputting the two or more tables and the vector R.

7. A method comprising:

at a computing platform comprising at least one processor, a communication interface, and memory:
inputting two or more tables into a statistical join function, wherein inputting the two or more tables into the statistical join function initiates execution of the statistical join function, and wherein executing the statistical join function comprises:
 a) identifying whether or not any of the two or more tables comprise a single row;
 b) if any of the two or more tables comprise a single row, executing an end condition function and returning to step a), wherein executing the end condition function joins at least two of the two or more tables comprising the single row and causes the at least two of the two or more tables comprising the single row to no longer comprise the single row;
 c) if none of the two or more tables comprise a single row, executing a partition tables function;
 d) identifying whether the two or more tables are both empty;
 e) if the two or more tables are both empty, executing a statistical join function to create a new table of the two or more tables, and returning to step a);
 f) if the two or more tables are not both empty, executing a merge tables function;
 g) identifying whether at least one of the two or more tables are empty;
 h) if at least one of the two or more tables are empty, executing an apply outer join function and returning to step a), wherein executing the apply outer join function creates a new table of the two or more tables;
 i) if none of the two or more tables are empty, identifying whether a vector R is empty, wherein the vector R is indicative of a merged version of the two or more tables;
 j) if R is empty, executing the apply outer join function and returning to step a), wherein executing the apply outer join function creates a new table of the two or more tables; and
 k) if R is not empty, generate a new table that includes information from the two or more tables in a single table; and sending, to a user device, the new table and one or more commands directing the user device to display the new table, wherein sending the one or more commands directing the user device to display the new table causes the user device to display the new table.

8. The method of claim 7, wherein executing the end condition function comprises:

extracting frequency data for columns of the two or more tables with common values, wherein extracting the frequency data comprises executing a columns with common values function on a vector FDATA to identify a number of columns of the vector FDATA that include the common values; and extracting a vector of columns with common values from the vector FDATA, wherein extracting the vector of columns comprises executing the apply outer join function, wherein the vector of columns comprises the vector R.

9. The method of claim 8, wherein executing the columns with common values function comprises:

for each column in a list of columns included in the two or more tables:
- storing a first set of values for each column from a first table of the two or more tables,
- storing a second set of values for each column from a second table of the two or more tables,
- storing an intersection of the first set of values and the second set of values,
- identifying that the intersection includes at least one value,
- based on identifying that the intersection includes the at least one value, storing a number of values comprising the intersection in the vector FDATA; and outputting the vector FDATA.

10. The method of claim 8, wherein executing the apply outer join function comprises:

applying an outerjoin function to join the at least two tables to create a sub-table;
adding the sub-table to the vector R;
setting the at least two tables to be empty; and
outputting the at least two tables and the vector R.

11. The method of claim 7, wherein executing the partition tables function comprises:

extracting frequency data for columns from the at least two tables with common values;
generating a vector FDATA using the frequency data;
extracting, from the vector FDATA, all columns for which values, common between the at least two tables, are greater than 1;
generating a vector CCSPLIT using the extracted columns;
identifying that CCSPLIT contains at least 1 column;
based on identifying that CCSPLIT contains the at least 1 column:
- generate, for each row of the CCSPLIT columns, a row value vector that includes values of each of the rows of the CCSPLIT columns;
- identify intersection vectors of the row value vectors and the extracted columns;
- store the intersection vectors as a vector CVAL, wherein the vector CVAL comprises an array of elements corresponding to the intersection vectors; and
- for each element of the vector CVAL that contains a value:
  - storing a corresponding column name from the extracted columns;
  - applying a split table function to generate new versions of the at least two tables;
  - applying a statistical join function to generate a new sub-table, wherein the at the statistical join function merges the at least two tables into the new sub-table;
  - adding the new sub-table to the vector R; and removing, from each of the two or more tables, rows belonging to the new version of the corresponding table of the two of more tables; and outputting the two or more tables and the vector R.

12. The method of claim 7, wherein executing the merge tables function comprises:

extracting frequency data for columns of the two or more tables in a vector FDATA;

inputting the vector FDATA into the columns with common values function;

based on execution of the columns with common values function on the vector FDATA, removing all columns for which values, common between the two or more tables are 1 and have a frequency of 1 in each of the two or more tables, resulting in a vector CCMERGE;

if the vector CCMERGE includes at least a single value:
generating, for each column of the vector CCMERGE, generate a binary mask;
for each binary mask:
extracting a vector CMROWS comprising a collection of corresponding rows from the two or more tables with the given binary mask applied;
for each element of the vector CMROWS that includes at least a single value:
using a split table function to define new versions of the two or more tables;
executing an outerjoin function to generate a new sub-table;
adding the new sub-table to the vector R; and
removing, from each of the two or more tables, rows belonging to the corresponding new versions of the two or more tables; and
outputting the two or more tables and the vector R.

13. One or more non-transitory computer-readable media storing instructions that, when executed by a computing platform comprising at least one processor, a communication interface, and memory, cause the computing platform to:

input two or more tables into a statistical join function, wherein inputting the two or more tables into the statistical join function initiates execution of the statistical join function, and wherein executing the statistical join function comprises:

a) identifying whether or not any of the two or more tables comprise a single row;

b) if any of the two or more tables comprise a single row, executing an end condition function and returning to step a), wherein executing the end condition function joins at least two of the two or more tables comprising the single row and causes the at least two of the two or more tables comprising the single row to no longer comprise the single row;

c) if none of the two or more tables comprise a single row, executing a partition tables function;

d) identifying whether the two or more tables are both empty;

e) if the two or more tables are both empty, executing a statistical join function to create a new table of the two or more tables, and returning to step a);

f) if the two or more tables are not both empty, executing a merge tables function;

g) identifying whether at least one of the two or more tables are empty;

h) if at least one of the two or more tables are empty, executing an apply outer join function and returning to step a), wherein executing the apply outer join function creates a new table of the two or more tables;

i) if none of the two or more tables are empty, identifying whether a vector R is empty, wherein the vector R is indicative of a merged version of the two or more tables;

j) if R is empty, executing the apply outer join function and returning to step a), wherein executing the apply outer join function creates a new table of the two or more tables; and k) if R is not empty, generate a new table that includes information from the two or more tables in a single table; and send, to a user device, the new table and one or more commands directing the user device to display the new table, wherein sending the one or more commands directing the user device to display the new table causes the user device to display the new table.

14. The one or more non-transitory computer-readable media of claim 13, wherein executing the end condition function comprises:

extracting frequency data for columns of the two or more tables with common values, wherein extracting the frequency data comprises executing a columns with common values function on a vector FDATA to identify a number of columns of the vector FDATA that include the common values; and extracting a vector of columns with common values from the vector FDATA, wherein extracting the vector of columns comprises executing the apply outer join function, wherein the vector of columns comprises the vector R.

15. The one or more non-transitory computer-readable media of claim 14, wherein executing the columns with common values function comprises:

for each column in a list of columns included in the two or more tables:
storing a first set of values for each column from a first table of the two or more tables,
storing a second set of values for each column from a second table of the two or more tables,
storing an intersection of the first set of values and the second set of values,
identifying that the intersection includes at least one value,
based on identifying that the intersection includes the at least one value, storing a number of values comprising the intersection in the vector FDATA; and
outputting the vector FDATA.

16. The one or more non-transitory computer-readable media of claim 14, wherein executing the apply outer join function comprises:

applying an outerjoin function to join the at least two tables to create a sub-table;
adding the sub-table to the vector R;
setting the at least two tables to be empty; and
outputting the at least two tables and the vector R.

\* \* \* \* \*